United States Patent [19]
Miyaguchi et al.

[11] 4,183,833
[45] Jan. 15, 1980

[54] NOVEL MODIFIED RESINS, PROCESS FOR PREPARING THE SAME, AND A COMPOSITION FOR PRINTING INK CONTAINING SAID MODIFIED RESINS AS VEHICLE COMPONENTS

[75] Inventors: Akinori Miyaguchi; Yasuyoshi Chino, both of Yokohama, Japan

[73] Assignees: Nippon Zeon Co. Ltd.; Morimura-Chemetron Ltd., both of Tokyo, Japan

[21] Appl. No.: 893,353

[22] Filed: Apr. 4, 1978

[30] Foreign Application Priority Data

Apr. 8, 1977 [JP] Japan .................................. 52/40120
Apr. 8, 1977 [JP] Japan .................................. 52/40121

[51] Int. Cl.² .................... C09D 3/727; C09D 3/733; C09D 11/10
[52] U.S. Cl. ................. 260/23.7 C; 106/27; 106/28; 525/196; 260/DIG. 38; 525/221
[58] Field of Search .......... 260/23.7 C, 879, DIG. 38; 106/27, 28

[56] References Cited

U.S. PATENT DOCUMENTS

| | | | |
|---|---|---|---|
| 2,387,895 | 10/1945 | Gerhart | 260/23.7 C |
| 3,084,147 | 4/1963 | Wilks | 260/23 X A |
| 3,428,589 | 2/1969 | Coats | 260/23.7 C |
| 3,448,066 | 6/1969 | Parker | 260/23.7 C |
| 3,520,840 | 7/1970 | Que | 260/23.7 C |
| 3,937,674 | 2/1976 | Laarkamp | 260/23.7 C |
| 3,984,381 | 10/1976 | Tsuchiya et al. | 106/27 |
| 4,028,119 | 6/1977 | Yamada et al. | 106/28 |

FOREIGN PATENT DOCUMENTS

| | | | |
|---|---|---|---|
| 468836 | 10/1950 | Canada | 260/23.7 C |
| 997626 | 7/1965 | United Kingdom | 260/23.7 C |

*Primary Examiner*—Ronald W. Griffin
*Attorney, Agent, or Firm*—Sherman & Shalloway

[57] ABSTRACT

A process for preparing novel modified resins comprising heating and reacting an addition product (A) of a cyclopentadiene resin and an α,β-unsaturated dicarboxylic acid anhydride with an addition product (B) of a higher aliphatic ester having a conjugated double bond and an α,β-unsaturated dicarboxylic acid anhydride, in an inert gas atmosphere in the presence or absence of a metal compound; and A novel composition for printing inks comprising, as a vehicle component, a modified resin obtained by the reaction of 95 to 40% by weight of an addition product (A) of a cyclopentadiene resin and an α,β-unsaturated dicarboxylic acid anhydride with 5 to 60% by weight of an addition product (B) of a higher aliphatic ester having a conjugated double bond and an α,β-unsaturated dicarboxylic acid, in an inert gas atmosphere.

21 Claims, No Drawings

NOVEL MODIFIED RESINS, PROCESS FOR PREPARING THE SAME, AND A COMPOSITION FOR PRINTING INK CONTAINING SAID MODIFIED RESINS AS VEHICLE COMPONENTS

The present invention is concerned with novel modified cyclopentadiene resins and more specifically, the invention deals with modified resins from cyclopentadiene resins, higher aliphatic esters and $\alpha,\beta$-unsaturated dicarboxylic acid anhydrides, which are effective as vehicle components of printing inks. The invention is further related to a process for preparing such modified resins, as well as to a printing ink composition containing such modified resins as vehicle components.

Printing inks are highly viscous dispersants having high pigment concentration. Resins used as a vehicle component for such inks must exhibit excellent properties required by the resins for inks, such as wettability to a pigment, solubility in an ink solvent, and tendency to get high molecular weight by the addition of a gellant such as an aluminum compound. Particularly, the resins used as a vehicle component for lithographic inks require excellent printability such as balance with dumpening solution, set, gloss, flow and the like.

Generally employed examples of the conventional vehicles for lithographic printing inks may be rosin-modified phenolic resins and alkyd resins. The former resins, however, were not sufficient in regard to the quality as a resin for inks, such as wettability to the pigment. The latter resins were excellent in regard to the quality as a resin for inks, but were poor in printing quality, such as insufficient balance with respect to dumpening solution. It is therefore modern tendency to use the resins other than the abovementioned resins. For example, there are developed methods which use petroleum resins or various modified products of the cyclopentadiene resins. Examples of such modified products are those modified products which are obtained by cooking a cyclopentadiene resin and a natural drying oil (U.S. Pat. No. 3,084,147), and modified products obtained by the reaction of a cyclopentadiene resin and a higher unsaturated aliphatic acid in the presence of a metal compound British Pat. No. 1,369,370). However, these modified products do not necessarily help obtain the improved properties required by the resins for printing inks, or in other words, do not necessary help obtain the improved wettability to the pigment, improved solubility in the ink solvent and the improved viscosity characteristics. Particularly, with the process of the aforesaid U.S. Patent in which the cyclopentadiene resin is reacted with the drying oil, the two components do not often react with each other, or the difference in reactivity between the two components often gives rise to the occurrence of selective gelation of the drying oil only; the resulting resin for inks has poor properties.

Therefore, it is an object of the present invention to provide a novel modified resin which is suited for use as a vehicle for printing inks, having excellent wettability to the pigment, solubility in the ink solvent and compatability with other resins for inks, as well as a process for preparing said modified resin.

Another object of the present invention is to provide a novel composition for printing inks having quality as a resin for inks such as wettability to the pigment, solubility in the ink solvent, compatability with the other resins for inks and property to attain a high molecular weight by the addition of a gellant, printing quality such as balance with the dumpening solution and scumming and tinting, press stability, print quality such as gloss, set, drying property, and rub-and-scratch resistance.

A further object of the present invention is to provide a composition for printing inks which enables the vehicle components to be prepared easily and efficiently.

As will be mentioned below, the inventors of the present invention have found that a modified resin which is very suited as a vehicle for printing inks is obtained if a cyclopentadiene resin is reacted with a special drying oil according to a special method, enabling the aforesaid objects of the present invention to be accomplished.

Thus, according to the present invention, there are provided a process for preparing a modified resin comprising thermally reacting an addition product (A) of a cyclopentadiene resin and $\alpha,\beta$-unsaturated dicarboxylic acid anhydride with an addition product (B) of a higher aliphatic acid ester having a conjugated double bond and an $\alpha,\beta$-unsaturated dicarboxylic acid anhydride in an inert gas atmosphere in the presence or absence of a metal compound, as well as a composition for printing inks containing said modified resin as a vehicle component.

The cyclopentadiene resin used as one of the starting materials of the present invention may be those which are obtained in a customary manner by the thermal polymerization of a cyclopentadiene-type monomer such as a cyclopentadiene, a methylcyclopentadiene, or a dimer, trimer thereof or a codimer thereof or those which are obtained by the thermal polymerization of a mixture of those cyclopentadiene-type monomers and smaller amounts of a comonomer which is copolymerizable therewith. Particularly, it is recommended to use those resins having a softening point of from 80° to 200° C., preferably from 100° to 170° C., and a Gardner color scale of less than 13. Concrete examples of the comonomers to be used are monoolefins such as ethylene, propylene, butene and styrene; conjugated dienes such as 1,3-butadiene, isoprene, and 1,3-pentadiene; and vinyl monomers having a polarity such as vinyl acetate, acrylic acid ester, methacrylic acid ester, acrylonitrile, and allyl alcohol. Among them, it is recommended to use a polymer of a cyclopentadiene-type monomer, or a copolymer of a cyclopentadiene-type monomer and a hydrocarbon-type comonomer such as monoolefin or a conjugated diene.

Further, according to the present invention, a higher aliphatic ester having a conjugated double bond is used as one of the starting materials, as mentioned above. Examples of such higher aliphatic esters are those esters derived from a monocarboxylic acid such as elastomeric acid or parinaric acid having more than 12 carbon atoms and a conjugated double bond in a molecular chain, and a monohydric or a polyhydric alcohol such as methanol, ethanol, butanol, octanol, ethylene glycol, glycerine, pentaerythritol, or trimethylol propane. Among them, it is recommended to use triesters of glycerin. These triesters are contained in natural drying oils such as tung oil, dehydrated castor oil, oiticica oil, and perilla oil. According to the present invention, therefore, it is recommended to use such natural drying oils as a source of higher aliphatic esters.

The present invention employs an $\alpha,\beta$-unsaturated dicarboxylic acid anhydride as another one of the starting materials. Its concrete examples may include maleic anhydride, citraconic anhydride, itaconic anhydride and alkyl substituents thereof. Among them, it is recommended to use the maleic anhydride from the viewpoint of reactivity, quality and economy. It is not, however, allowed to obtain a modified resin suited as a resin for inks even if an α,β-unsaturated dicarboxylic acid is used, such as maleic acid, itaconic acid or citraconic acid.

According to the present invention, it is essential to react these starting materials according to a special procedure, instead of reacting them arbitrarily. In other words, it is essential first to form an addition product (A) of a cyclopentadiene resin and an α,β-unsaturated dicarboxylic acid anhydride and an addition product (B) of a higher aliphatic ester and an α,β-unsaturated dicarboxylic acid anhydride, and then react the thus formed two addition products. Even if the procedure is changed to first reacting the cyclopentadiene resin with a higher aliphatic ester, the reaction does not almost takes place between the two components, whereby the higher aliphatic ester only is selectively gelatinized, making it difficult to obtain a modified resin having a high molecular weight. The aforesaid procedure of the present invention, however, is not to strictly restrict the order of adding the three starting materials. For example, it is possible to mix the cyclopentadiene resin and the higher aliphatic ester beforehand under such conditions that the latter compound does not undergo gelatinization, followed by the addition of the α,β-unsaturated dicarboxylic acid anhydride to form the addition products (A) and (B) simultaneously in situ, and then heating a mixture of the thus formed addition product (A) and the addition product (B) or adding a catalyst to said mixture, so that the desired reaction will take place between the addition product (A) and the addition product (B).

The α,β-unsaturated dicarboxylic acid anhydride is used in an amount which is sufficient to enhance the reactivity between the cyclopentadiene resin and the higher aliphatic ester. Thus, the addition product (A) consists of the addition of the α,β-unsaturated dicarboxylic acid anhydride in an amount of at least 0.1 part by weight, preferably in an amount of 0.2 to 50 parts by weight per 100 parts by weight of the cyclopentadiene resin, and the addition product (B) consists of the addition of the α,β-unsaturated dicarboxylic acid anhydride in an amount of at least 0.1 part by weight, preferably in an amount of 0.2 to 50 parts by weight per 100 parts by weight of the higher aliphatic ester.

The reaction ratios between the addition product (A) and the addition product (B) will be 98 to 35% by weight for the former and 2 to 65% by weight for the latter. Depending upon such reaction ratios between the addition product (A) and the addition product (B), the amount of the higher aliphatic ester used greatly varies with respect to the cyclopentadiene resin, and the properties of the resulting modified resin varies correspondingly over a wide range.

The reaction of the cyclopentadiene resin with the α,β-unsaturated dicarboxylic acid anhydride for preparing the addition product (A), and the reaction of the higher aliphatic ester with the α,β-unsaturated dicarboxylic acid anhydride for preparing the addition product (B), can be effected according to a customary manner. For example, the addition products can be easily obtained by heating a mixture of the starting materials at a temperature of 150° to 250° C. for about 10 minutes to 5 hours.

According to the present invention, the thus separately prepared addition product (A) and the addition product (B) are mixed together, or a mixture consisting of the cyclopentadiene resin and the higher aliphatic ester is acted upon by the α,β-unsaturated dicarboxylic acid anhydride thereby to form a mixture of the addition product (A) and the addition product (B) in situ, and thereafter the addition product (A) and the addition product (B) are reacted together under a heated condition in an inert gas atmosphere such as nitrogen or argon. The reaction conditions at this time will usually be a temperature of 190° to 300° C. and a reaction time of 30 minutes to 8 hours. If the temperature is too low, the reaction proceeds slowly. Contrary, if the temperature is too high, the resin tends to be dark colored or decomposed. The reaction is usually performed in the absence of a diluent. As required, however, diluents may be used, such as commonly used hydrocarbon-type solvents, for example, benzene, toluene, xylene, tetralin, and mineral oil, or natural oils which are inert in the reaction, for example, linseed oil, soybean oil and the like.

Further, according to the present invention, the reaction of the addition product (A) with the addition product (B) may be effected using, as required, a metal compound as a catalyst. Preferred examples of the metal compounds may be those compounds containing metals pertaining to Group IV, Group VII and Group VIII of periodic table, such as titanium, zirconium, tin, lead, manganese, iron, cobalt, nickel, ruthenium, rhodium and palladium. Among the metal compounds, it is recommended to use the compounds which are soluble in the cyclopentadiene resin and the higher aliphatic ester, particularly organic acid salts and organic chelate compounds. There is no limitation to the amount of using the metal compounds. To quickly perform the reaction, however, it is preferred to use the metal compound in an amount of 0.1 to 10 parts by weight, particularly in an amount of 0.2 to 8 parts by weight per 100 parts by weight of the resultant amount of the addition product (A) and the addition product (B).

According to the present invention, the cyclopentadiene resin in the addition product (A) reacts with the higher aliphatic ester in the addition product (B), thereby to form a novel modified resin having a high molecular weight. The modified resin will usually have a softening point over a range of 40° to 180° C., and exhibits excellent wettability to the pigment and solubility in the ink solvents, as well as compatibility with natural drying oils, rosin-modified phenol, alkyd resin, phenol resin, maleic acid resin, xylene resin, ketone resin and petroleum resin.

Such a modified resin will be used in the fields where cyclopentadiene resins such as paints, adhesives, and varnish are generally used, and is also suited as a resin (vehicle) for inks.

According to the present invention, printing inks can be prepared by way of a customary manner with the exception of using the aforementioned modified resin as an essential component for vehicle. For example, 100 parts by weight of the modified resin is admixed with 0 to 200 parts by weight of an oxidation-hardening components such as a drying oil (e.g., natural drying oil without having conjugated double bond such as linseed oil, soybean oil, or a synthetic drying oil obtained by the polymerization of diolefin), an alkyd resin modified with such drying oil, or rosin-modified phenol resin, and the resulting mixture is heated at 20° to 300° C. for 0.5 to 5 hours, and, as required, dissolved in up to 200 parts by weight of a high-boiling petroleum solvent, such as Solvent No. 5, solvent No. 4 or Solvent No. 3 thereby to prepare a vehicle. The thus prepared vehicle is then admixed with a pigment such as Carmine 6B, Phthalocyanine Blue, Benzidine Yellow, titanium white, or channel black, and the mixture is ground with a 3-roll mill, thereby to prepare a printing ink.

A preferred modified resin used for the inks according to the present invention is prepared by heating and reacting 95 to 40% by weight, preferably 85 to 50% by weight of the addition product (A) consisting of 100 parts by weight of the cyclopentadiene resin and 0.3 to 15 parts by weight, preferably 0.5 to 10 parts by weight of the $\alpha,\beta$-unsaturated dicarboxylic acid anhydride, with 5 to 60% by weight, preferably 15 to 50% by weight of the addition product (B) consisting of 100 parts by weight of the higher aliphatic acid having conjugated double bond and 0.3 to 15 parts by weight, preferably 0.5 to 10 parts by weight of the $\alpha,\beta$-unsaturated dicarboxylic acid anhydride, in an inert gas atmosphere in the presence or absence of a metal compound. Especially, from the viewpoint of adaptability as a resin for inks, it is recommended to use the modified resins having a softening point within a range of 60° to 180° C. If the addition product (A) is used in excess amounts, the resulting modified resin loses the quality as a resin for inks, such as wettability to the pigment. Conversely, if the addition product (A) is used in too small amounts, the reduced viscosity causes the resulting modified resin to lose the quality as a resin for inks as well as to lose print quality such as drying property. Further, when the ratio of the $\alpha,\beta$-unsaturated dicarboxylic acid anhydride in the addition products (A) and (B) is too low, the resin fails to get high molecular weight by the addition of a gellant and exhibits poor wettability to the pigment; the resulting modified resin lacks the quality as a resin for inks. When the ratio is too high, the resulting modified resin lacks the quality at the time of printing, for example, scumming and tinting.

Vehicles for inks were so far prepared by cooking a mixture of two or more components such as a combination of natural drying oil and alkyd resin. According to the present invention, a printing ink having excellent properties is obtained without the need of cooking the modified resin when it is used alone or even when it is used in combination with a rosin-modified phenol resin, alkyd resin and linseed oil.

The composition for printing inks of the present invention has excellent quality as a resin for inks such as wettability to the pigment and the like, excellent printing quality such as balance with the dumpening solution, scumming and tinting press stability, excellent print quality such as gloss, set, drying property, rub-and-scratch resistance. The composition of the present invention therefore is suited for preparing inks for offset printing, inks for gravure printing as well as other inks.

The invention is illustrated below concretely with reference to working Examples. In the Examples, inks are prepared and properties of the inks are evaluated according to the below-mentioned recipe. Further, parts and percent are all by weight.

Preparation of Inks

100 Parts of a modified resin and 66.7 parts of a petroleum-type solvent (Solvent No. 5, a product of Nippon Oil Co.) are heated and stirred at 180° for 20 minutes, followed by the addition of 2 parts of an aluminum chelate-type gelatinizer (Al-CH, a product of Kawaken Fine Chemical Co.), and the mixture is stirred at 170° C. for 1 hour and gelatinized to prepare a vehicle. The viscosities of the mixture are measured at 25° C. before gelatinized and after gelatinized. To 100 parts of the vehicle is then added 17.7 parts of Phthalocyanine Blue (TGR, a product of Dainippon Ink and Chemicals Inc.), and ground by a three-roll mill, followed by the addition of a small amount of a petroleum-type solvent in order to adjust the Inkometer reading to 10 at 90° F. and 400 rpm, thereby to prepare an ink.

Evaluation of Ink Properties

Wettability to the pigment; The dispersability when ground by a three-roll mill, and the flow are observed, and the ink is printed on a coated paper using a RI tester, to examine and evaluate the color properties. (Shade, strength, transparency gloss, etc.)

Print quality; The ink is printed on the coated paper using an RI tester in an amount of 0.1 g/100 cm$^2$, and the quality is evaluated in accordance with the following conditions.

(1) Set—Examined based on the extinction of stickiness as touched with a finger and based on the sticky feeling at the time of peeling off a tissue paper therefrom.
(2) Drying property—Measured using a Choyokai-type drying tester under the conditions of 25° C. and 60 RH.
(3) Gloss—After 12 hours from the printing, a test piece is measured for its mirror surface reflection gloss at an angle of 60 degrees using a Glossmeter GM-3 manufactured by Murakami Shikisai Kenkyujo Co.
(4) Rub and scratch resistance—After 24 hours from the printing, the test piece is measured for its Rub and scratch resistance using a Southerland Rubotester under the condition of 10–25 strokes/4 lbs.
(5) Press stability—The operation is continued using the RI tester by applying the ink in an amount of 0.2 g/100 cm$^2$, and the increase in viscosity is observed.

Printing quality; The ink is printed on a coated paper using a Rholand II-type printing machine, to examine and evaluate the balance in regard to dumpening solution, scumming and tinting, set, gloss and flow.

The aforesaid properties of the ink of the present invention are compared with generally available inks prepared by a customary manner using a rosin-modefied resin or an alkyd resin. The symbol O indicates when the property is superior, $\Delta$ indicates when the property is the same, and X indicates when the property is inferior.

EXAMPLE 1

100 Parts of a cyclopentadiene resin (resin A) having a softening point of 135° C. and a Gardner color scale of 4 obtained by the thermal polymerization of a cyclopentadiene of a purity of 97% in the presence of xylene at 260° C. for 4 hours, 50 parts of tung oil and 4 parts of maleic anhydride were added in the order shown in Table 1 and reacted together under the conditions shown in Table 1. To the reaction product was added 1 part of zirconium octoate and the temperature was raised at 240° C. to perform the reaction for 5 hours. The softening point and Gardner color scale of the resulting modified resin were measured. 40 Parts of the modified resin was then dissolved in 60 parts of a petroleum-type solvent (Solvent No. 5, a product of Nippon Oil Co.) to measure the viscosity (Gardner indication) of the solution.

100 Parts of the modified resin and 66.7 parts of the petroleum-type solvent were heated and stirred at 180° C. for 20 minutes, and to which was added 2 parts of an aluminum chelate-type gellant (AL-CH, a product of Kawaken Fine Chemical Co.) which is ordinarily used for the preparation of a resin for inks. The mixture was stirred at 170° C. for 1 hour and gelatinized followed by the addition of 17.7 parts of Phthalocyanine Blue (TGR, a product of Dainippon Ink and Chemicals Inc.), and is then ground using the three-roll mill. The dispersability, stability, color properties and gloss were observed to evaluate the wettability to the pigment.

For the purpose of comparison, a non-modified cyclopentadiene resin (resin A) and a rosin-modified phenol resin (TAMANOL, softening point of 158° C., a product of Arakawa Kagaku Co.) which is recommended as a vehicle for inks were also examined to evaluate their wettability to the pigment. The results were as shown in Table 1.

Table 1

| | This invention | Control | | | |
|---|---|---|---|---|---|
| Experiment No. | 1-1 | 1-2 | 1-3 | 1-4 | 1-5 Rosin-modified phenol resin |
| Order of addition* | X | Y | Z | Resin A | |
| Softening point | 110 | 98 | 89 | 135 | 158 |
| Property Appearance | Clear | Opaque Measurement impossible | Opaque Measurement impossible | Clear | Clear |
| Gardner color scale | 16 | | | 4 | 6 |
| Viscosity of solution (Gardner) Wettability | S | I | H | F | Not measured |

Table 1-continued

| | This invention | Control | | | |
|---|---|---|---|---|---|
| Experiment No. | 1-1 | 1-2 | 1-3 | 1-4 | 1-5 Rosin-modified phenol resin |
| Order of addition* to pigment | X O | Y x | Z x | Resin A x | x |

*Order of addition X; After resin A and tung oil are heated and melted at 170° C., maleic anhydride is added and stirred at 180° C. for 1 hour.
Order of addition Y; After resin A and maleic anhydride are heated and stirred at 190° C. for 1 hour, tung oil is added.
Order of addition Z; After tung oil and maleic anhydride are heated and stirred at 170° C. for 1 hour, resin A is added.

From the above results, it will be understood that the modified resin of the present invention which is reacted with the resin A has a high molecular weight and exhibits very high viscosity. Even when not cooked together with other drying oil and alkyd resin, the modified resin of the present invention exhibits excellent wettability to the pigment. However, when the process of the present invention is not applied (Experiment Nos. 1-2 and 1-3), the modified resin fails to attain high molecular weight. The modified resin has opaque appearance and is not suited for the preparation of a varnish for inks. The rosin-modified phenol resin (Experiment No. 1-5) is usually used being cooked together with a drying oil. However, when dissolved by itself in a solvent without being cooked, the rosin-modified phenol resin exhibits poor wettability to the pigment and is not usable as a resin for inks.

EXAMPLE 2

An ink was prepared according to the aforementioned recipe using the modified resin obtained by Experiment No. 1-1 of Example 1 above, and its properties were evaluated. For the purpose of comparison, inks were also prepared in the same manner as above using the modified resin obtained by Experiment No. 1-2 of Example 1, using the resin obtained by Experiment No. 1-3 of Example 1, using the rosin-modified resin and using the alkyd resin, and their properties were evaluated. The results were as shown in Table 2 below.

Table 2

| | This invention | Control | | | | |
|---|---|---|---|---|---|---|
| Experiment No. | 2-1 | 2-2 | 2-3 | 2-4 | 2-5 | 2-6 |
| Order of adding modified resins | No.1-1 X | No.1-2 Y | No.1-3 Z | *1 — | *2 — | *3 — |
| Softening point (°C.) | 110 | 98 | 89 | — | — | — |
| Viscosity (poises) Before gelatinized | 100 | | | 150 | 120 | 138 |
| After gelatinized | 500 | Ink was not prepared because clear varnish was not formed | Same as left | 155 | 190 | 220 |
| Wettability to pigment | | | | x | Δ | Δ |
| Print quality Set | | | | Ink was not allowed to be prepared because of poor wettability to the pigment | Δ | Δ |
| Drying property | | | | | Δ | Δ |
| Gloss | | | | | Δ | Δ |
| Rub and scratch resistance | | | | | Δ | Δ |
| Press stability | | | | | Δ | Δ |

Table 2-continued

| Experiment No. | This invention 2-1 | Control 2-2 | 2-3 | 2-4 | 2-5 | 2-6 |
|---|---|---|---|---|---|---|
| Printing quality | | | | | Δ | Δ |

*[1] Prepared in the same manner as the other inks with the exception of using 45 parts of the rosin-modifiedphenol resin (TAMANOL 361, softening point of 154° C., a product of Arakawa Kagaku Co.) and 55 parts of a petroleum-type solvent (Solvent No. 5).
*[2] Prepared in the same manner as the other inks with the exception of cooking a mixture consisting of 38 partsof the rosin-modifiedphenol resin and 7 parts of tung oil by a customary manner, followed by the addition of 25 parts of Lithographic varnish (1.2 poises/25° C.) and 30 parts of petroleum-type solvent (Solvent No. 5).
*[3] Prepared in the same manner as the other inks with the exception of cooking 38 parts by weight of the rosin-modified phenol resin and 12 parts of alkyd resin (Beckasite 8011, a product of Japan Reichhold Co.) in a customary manner, followed by the addition of 20 partsof Lithographic varnish (1.2 poises/25° C.) and 30 parts of a petroleum-type solvent (Solvent No. 5).

From the above results, it will be understood that the ink of the present invention easily acquires high molecular weight by the addition of a gellant and is excellent in regard to printing quality and print quality. However, when the orders of addition are Y and Z, i.e., when the modified resin is obtained by preparing the addition product of the resin A and maleic anhydride or the addition product of tung oil and maleic anhydride, and then reacted by the addition of other components, it will be understood that the resulting varnish is opaque and is not suited as a resin for inks and exhibits poor wettability to the pigment. The rosin-modified phenol resin, on the other hand, is not usable if it is not cooked together with the tung oil and the alkyd resin (Experiment No. 2-4). In this regard, the composition of the present invention is very advantageous.

EXAMPLE 3

Addition product (A) consisting of 100 parts of the resin A and 2.5 parts of maleic anhydride, and addition product (B) consisting of 100 parts of various natural drying oils shown in Table 3 and 1.5 parts of maleic anhydride, were prepared beforehand. A mixture consisting of 100 parts of the addition product (A) and 50 parts of the addition product (B) was reacted followed by the addition of 1 part of zirconium octoate at 240° C. for 5 hours thereby to obtain modified resins. Inks were then prepared using the thus obtained modified resins, and their properties were evaluated. The results were as shown in Table 3 below.

Table 3

| Experiment No. | Present invention 3-1 | 3-2 | 3-3 | 3-4 | Control 3-5 |
|---|---|---|---|---|---|
| Natural drying oil | Tung oil | Dehydrogenated caster oil | Oiticica oil | Tung oil (20%) + linseed oil (80%) | Linseed oil |
| Properties of modified resins | | | | | |
| Softening point (° C.) | 110 | 108 | 108 | 106 | 83 |
| Appearance | clear | clear | clear | clear | opaque |
| Viscosity of solution | S | R | R | O | G |
| Viscosity (poises) | | | | | Ink was not prepared because clear varnish was not formed |
| Before gelatinized | 95 | 98 | 97 | 90 | |
| After gelatinized | 500 | 470 | 480 | 400 | |
| Wettability to pigment | | | | | |
| Printing quality | | | | Δ | |

From the above results it will be understood that use of the dehydrated castor oil having conjugated double bond makes it possible to obtain the results similar to that of the tung oil, whereas use of the linseed oil does not almost work to create the reaction for increasing the molecular weight making it difficult to prepare the inks.

EXAMPLE 4

100 Parts of the resin A and varying amounts of tung oil were heated and melted at 170° C., followed by the addition of 4 parts of maleic anhydride. The mixture was heated and stirred at 180° C. for 1 hour, followed by the addition of 1 part of zirconium octoate to further carry out the reaction at 240° C. for 5 hours. The results were as shown in Table 4 below.

Table 4

| Experiment No. | | 4-1 | 4-2 | 4-3 | 4-4 | 4-5 |
|---|---|---|---|---|---|---|
| Amount of tung oil added (parts) | | 5 | 25 | 50 | 100 | 150 |
| Property | Softening point(°C.) | 130 | 105 | 110 | 85 | 70 |
| | Appearance | clear | clear | clear | clear | clear |
| | Viscosity of solution | L | O | S | N | L |

From the above results, it will be understood that the reaction of the resin A with the tung oil proceeds well even when the amount of the tung oil is varied.

EXAMPLE 5

Inks were prepared using various modified resins prepared in accordance with the procedure of Example 3, and their properties were evaluated. The results were as shown in Table 5 below.

Table 5

| Experiment No. | Control 5-1 | This invention 5-2 | 5-3 | 5-4 | 5-5 |
|---|---|---|---|---|---|
| Amount of tung oil added (parts) | 0 | 25 | 50 | 75 | 100 |
| Softening point of modified resin (°C.) | 140 | 105 | 110 | 95 | 85 |
| Viscosity (poises) | | | | | |
| Before gelatinized | 60 | 90 | 95 | 85 | 77 |
| After gelatinized | 65 | 420 | 500 | 400 | 340 |
| Wettability to pigment | x | Δ | | | |
| Printing quality | Measurement impossible | | Δ | | Δ |

From the above results it will be understood that the absence of the tung oil gives very poor results (Experiment No. 5-1), but the systems in which is present the tung oil give very good properties.

EXAMPLE 6

100 Parts of the resin A and 50 parts of the tung oil were heated and melted at 170° C., followed by the addition of 4 parts of maleic anhydride. The mixture was heated and stirred at 180° C. for 1 hour, further followed by the addition of 1 part of metal compounds shown in Table 6 thereby to obtain modified resins (Experiment Nos. 6-2, 6-3 and 6-4). Separately, 100 parts of the resin A and 50 parts of the tung oil were heated and melted at 170° C., followed by the addition of 4 parts of maleic anhydride, and then heated and stirred at 180° C. for 1 hour. The resulting mixture was heated at 260° C. and reacted for 5 hours without adding the metal compounds shown in Table 6 (Experiment No. 6-1). Inks were prepared using the thus obtained various resins, and their properties were evaluated. The results were as shown in Table 6.

Table 6

| Experiment No. | 6-1 No addition | 6-2 Lead octenoate | 6-3 Cobalt octenoate | 6-4 Manganese octenoate |
|---|---|---|---|---|
| Metal compound | | | | |
| Properties of modified resins | | | | |
| Softening point (°C.) | 101 | 111 | 107 | 106 |
| Appearance | clear | clear | clear | clear |
| Viscosity of solution | P· | A | R | R |
| Viscosity (poises) | | | | |
| Before gelatinized | 86 | 100 | 95 | 90 |
| After gelatinized | 400 | 510 | 450 | 410 |
| Wettability to pigment | | | | |
| Printing quantity | | | | |

From the above results, it will be understood that excellent results are obtained even the kind of metal compound is changed, and the reaction proceeds even in the absence of a metal compound, making it possible to obtain modified resins having good properties required for inks.

EXAMPLE 7

Modified resins were prepared by effecting the reaction in the same manner as in Experiment No. 1-1 of Example 1 with the exception of using various cyclopentadiene resins (resins B, C and D) that are available on the market instead of using the resin A. Inks were then prepared using the thus modified resins, and their properties were evaluated. The results were as shown in Table 7 below.

Table 7

| Experiment No. | 7-1 | 7-2 | 7-3 |
|---|---|---|---|
| Type of resin* | B | C | D |
| Property of resin | | | |
| Softening point (°C.) | 116 | 110 | 112 |
| Appearance | clear | clear | clear |
| Viscosity of solution | T | S | S |
| Viscosity (poises) | | | |
| Before gelatinized | 102 | 101 | 98 |
| After gelatinized | 501 | 508 | 500 |
| Wettability to pigment | | | |
| Printing quality | | | |

*Resin B; softening point 160° C. (LX-1035, a product of NEVIL Co.)
Resin C; softening point 140° C. (PICODIENE 2285, a product of PICCO Co.)
Resin D; softening point 145° C. (QUINTONE 1345, a product of Nippon Zeon Co.)

From the above results it will be understood that the modified resins having good properties required for the inks are obtained even when various cyclopentadiene resins are used.

What is claimed is:

1. A process for preparing modified resins comprising heating and reacting an addition product (A) of a cyclopentadiene resin and an $\alpha,\beta$-unsaturated dicarboxylic acid anhydride with an addition product (B) of a higher aliphatic ester having a conjugated double bond and an $\alpha,\beta$-unsaturated dicarboxylic acid anhydride, in an inert gas atmosphere.

2. A process according to claim 1, wherein the modified resin has a softening point of from 40° to 180° C.

3. A process according to claim 1, wherein the metal compound is a compound of a metal of Group IV, Group VII or Group VIII of the periodic table.

4. A process according to claim 1, wherein the reaction of the addition product (A) with the addition product (B) is effected at a temperature of from 190° to 300° C.

5. A process according to claim 1, wherein the addition product (A) is reacted with the addition product (B) at a weight ratio of 98-35% to 2-65%.

6. A process according to claim 5, wherein the addition product (A) is composed of 100 parts by weight of the cyclopentadiene resin and 0.1 to 50 parts by weight of the $\alpha,\beta$-unsaturated dicarboxylic acid anhydride.

7. A process according to claim 6, wherein the addition product (B) is commmposed of 100 parts by weight of the higher aliphatic ester with more than 12 carbon atoms having a conjugated double bond, and 0.1 to 50 parts by weight of the $\alpha,\beta$-unsaturated dicarboxylic acid anhydride.

8. A process according to claim 1, wherein the cyclopentadiene resin has a softening point of from 80° to 200° C.

9. A process according to claim 1, wherein the higher aliphatic ester is a tung oil, dehydrated castor oil, oiticica oil or perilla oil.

10. A modified resin obtained by the process of any one of claims 1 to 9.

11. A Vehicle component composition for printing inks comprising, a modified resin obtained by the reaction of 95 to 40% by weight of an addition product (A) of a cyclopentadiene resin and an $\alpha,\beta$-unsaturated dicarboxylic acid anhydride with 5 to 60% by weight of an addition product (B) of a higher aliphatic ester having a conjugated double bond and an $\alpha,\beta$-unsaturated dicarboxylic acid, in an inert gas atmosphere.

12. A composition for inks according to claim 11, wherein the modified resin has a softening point of 60° to 180° C.

13. A composition for inks according to claim 12, wherein the modified resin is obtained by reacting the addition product (A) with the addition product (B) at a temperature of from 190° to 300° C.

14. A composition for inks according to claim 13, wherein the reaction is effected in the presence of a metal compound.

15. A composition for inks according to claim 14, wherein the metal compound is a compound of a metal of Group IV, Group VII or Group VIII of the periodic table.

16. A composition for inks according to claim 11, wherein the addition product (A) consists of 100 parts by weight of a cyclopentadiene resin and 0.3 to 15 parts by weight of the α,β-unsaturated dicarboxylic acid anhydride.

17. A composition for inks according to claim 16, wherein the addition product (B) consists of 100 parts by weight of the higher aliphatic ester and 0.3 to 15 parts by weight of the α,β-unsaturated dicarboxylic acid anhydride.

18. A composition for inks according to claim 11, wherein the cyclopentadiene resin has a softening point of from 80° to 200° C.

19. A composition for inks according to claim 11, wherein the higher aliphatic ester is a tung oil, dehydrated castor oil, oiticica oil or perilla oil.

20. A process according to claim 1, wherein the addition product (A) and the addition product (B) are heated and reacted in the presence of a metal compound.

21. In an ink comprising a vehicle component, pigment and solvent the improvement which comprises the vehicle component according to claim 11.

* * * * *